US009399260B2

(12) United States Patent
Hara et al.

(10) Patent No.: US 9,399,260 B2
(45) Date of Patent: Jul. 26, 2016

(54) WIRE ELECTRICAL DISCHARGE MACHINING APPARATUS

(75) Inventors: Masayuki Hara, Tokyo (JP); Hiroatsu Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 240 days.

(21) Appl. No.: 14/362,813

(22) PCT Filed: Jan. 11, 2012

(86) PCT No.: PCT/JP2012/050399
§ 371 (c)(1),
(2), (4) Date: Jun. 4, 2014

(87) PCT Pub. No.: WO2013/105235
PCT Pub. Date: Jul. 18, 2013

(65) Prior Publication Data
US 2014/0330423 A1    Nov. 6, 2014

(51) Int. Cl.
*B23H 7/20* (2006.01)
*B23H 7/06* (2006.01)

(52) U.S. Cl.
CPC .................. *B23H 7/20* (2013.01); *B23H 7/065* (2013.01); *B23H 2300/10* (2013.01); *G05B 2219/45221* (2013.01)

(58) Field of Classification Search
CPC ...... B23H 7/20; B23H 7/065; B23H 2300/10; G05B 2219/45221
See application file for complete search history.

(56) References Cited

U.S. PATENT DOCUMENTS

| 4,837,415 | A | * | 6/1989 | Magara | B23H 7/065 219/69.12 |
|---|---|---|---|---|---|
| 5,047,606 | A | * | 9/1991 | Hiramine | B23H 7/065 219/69.12 |
| 5,185,507 | A | * | 2/1993 | Yasui | B23H 7/20 219/69.12 |
| 5,418,344 | A | * | 5/1995 | Magara | B23H 7/065 219/69.12 |
| 5,808,263 | A | | 9/1998 | Beltrami | |

(Continued)

FOREIGN PATENT DOCUMENTS

| JP | 58-114823 A | 7/1983 |
|---|---|---|
| JP | 58-120428 A | 7/1983 |

(Continued)

OTHER PUBLICATIONS

International Search Report for PCT/JP2012/050399 dated Apr. 17, 2012.

*Primary Examiner* — Ramesh Patel
(74) *Attorney, Agent, or Firm* — Sughrue Mion, PLLC

(57) ABSTRACT

A wire electrical discharge machining apparatus includes a target-control-section calculating unit calculating a target control section, which is indicated by a start point and an end point of the corner control in a current electrical discharge machining during the finish machining, based on a machining parameter; an actual-control-section calculating unit correcting the start point and the end point of the corner control, which are indicated in the target control section calculated by the target-control-section calculating unit, and calculating an actual control section, based on a magnitude of a shape error of the corner portion in a previous electrical discharge machining during the finish machining; and a speed controlling unit controlling the feed speed of the wire such that an amount of machining per unit time in the actual control section becomes equal to that when a portion other than the corner portion is machined.

4 Claims, 19 Drawing Sheets

(56) References Cited

U.S. PATENT DOCUMENTS

| | | | |
|---|---|---|---|
| 5,935,456 A | 8/1999 | Braunschweiler et al. | |
| 6,396,021 B1 * | 5/2002 | Sato | B23H 1/024 219/69.12 |
| 6,552,291 B1 * | 4/2003 | Kobayashi | B23H 7/101 219/69.12 |
| 6,675,061 B2 * | 1/2004 | Hirai | G05B 19/4103 318/568.15 |
| 6,832,126 B2 * | 12/2004 | Irie | B23H 7/065 219/69.11 |
| 6,934,601 B2 * | 8/2005 | Hirai | G05B 19/4099 318/570 |
| 8,642,915 B2 * | 2/2014 | Onodera | B23H 7/065 219/69.12 |
| 8,829,383 B2 * | 9/2014 | Onodera | B23H 7/065 219/69.12 |
| 2003/0098294 A1 * | 5/2003 | Goto | B23H 7/065 219/69.12 |
| 2005/0040142 A1 * | 2/2005 | Kawahara | B23H 7/065 219/69.12 |
| 2005/0127041 A1 * | 6/2005 | Kobayashi | B23H 7/04 219/69.13 |
| 2006/0091113 A1 * | 5/2006 | Hiraga | B23H 7/04 219/69.12 |
| 2011/0100959 A1 | 5/2011 | Onodera et al. | |

FOREIGN PATENT DOCUMENTS

| | | |
|---|---|---|
| JP | 63-229228 A | 9/1988 |
| JP | 1-501051 A | 4/1989 |
| JP | 6-126536 A | 5/1994 |
| JP | 7-285029 A | 10/1995 |
| JP | 10-34443 A | 2/1998 |
| JP | 10-58238 A | 3/1998 |
| JP | 2002-160127 A | 6/2002 |
| JP | 2004-148472 A | 5/2004 |
| JP | 2005-66738 A | 3/2005 |
| JP | 2006-123065 A | 5/2006 |
| WO | 2010/001472 A1 | 1/2010 |
| WO | 2010/050014 A1 | 5/2010 |

* cited by examiner

WIRE ELECTRICAL DISCHARGE MACHINING APPARATUS

CROSS REFERENCE TO RELATED APPLICATIONS

This application is a National Stage of International Application No. PCT/JP2012/050399, filed on Jan. 11, 2012, the contents of which are incorporated herein by reference in their entirety.

FIELD

The present invention relates to a wire electrical discharge machining apparatus.

BACKGROUND

In conventional technologies, it is assumed that shape errors in a corner portion occur due to the deflection of the wire and measures, such as adjusting the discharge power, increasing the tension, using dwell, and performing trajectory control, to correct the deflection of the wire, are taken in order to reduce the deflection of the wire during corner machining as a method of improving the rough machining corner accuracy (see Patent Literatures 1 and 2).

Moreover, as a method of improving the corner accuracy during finish machining, there are a method (see Patent Literatures 3 and 4) in which speed control is performed in accordance with the change of the amount of machining in the corner portion and a method (see Patent Literature 5) in which the change of the amount of machining is estimated before the corner portion is machined and a correction is made for the change of the side surface gap of the wire electrode in the corner portion on the basis of the estimation result.

CITATION LIST

Patent Literature

Patent Literature 1: Japanese Patent Application Laid-open No. S58-114823
Patent Literature 2: Japanese Patent Application Laid-open No. S58-120428
Patent Literature 3: Japanese Patent Application Laid-open No. S63-229228
Patent Literature 4: Japanese Patent Application Laid-open No. H06-126536
Patent Literature 5: Japanese Patent Application Laid-open No. 2004-148472

SUMMARY

Technical Problem

However, during rough machining, the deflection of the wire during corner machining cannot be completely eliminated; therefore, it is difficult to machine the workpiece such that corners are machined with no shape error from the upper surface to the lower surface.

The out sharp edge corners (acute angle that is outwardly convex) are affected the most by the deflection of the wire and shape errors occur easily in the out sharp edge corners. In the corner control during finish machining in the conventional technologies, with regard to the out-sharp-edge-corner control section, the corner control section is not definitely indicated. Moreover, even when the corner control section is indicated, the control section is calculated on the premise that a shape error does not occur despite the fact that the shape error actually occurs in rough machining. Consequently, there is a problem in that a shape error occurs even if the corner control in the conventional technologies is used at the time of finish machining.

The present invention has been achieved in view of the above and an object of the present invention is to obtain a wire electrical discharge machining apparatus capable of realizing highly accurate out-sharp-edge-corner control.

Solution to Problem

In order to solve the above problems and achieve the object, the present invention is a wire electrical discharge machining apparatus that performs electrical discharge machining between a wire and a workpiece a plurality of times while performing corner control in which a feed speed of the wire when a corner portion is machined in finish machining is made higher than that when a portion other than the corner portion is machined, including a target-control-section calculating unit that calculates a target control section, which is indicated by a start point and an end point of the corner control in a current electrical discharge machining during the finish machining, on a basis of a machining parameter; an actual-control-section calculating unit that corrects the start point and the end point of the corner control, which are indicated in the target control section calculated by the target-control-section calculating unit, and calculates an actual control section, on a basis of a magnitude of a shape error of the corner portion in a previous electrical discharge machining during the finish machining; and a speed controlling unit that controls the feed speed of the wire such that an amount of machining per unit time in the actual control section becomes equal to that when a portion other than the corner portion is machined.

Advantageous Effects of Invention

The wire electrical discharge machining apparatus according to the present invention has an effect that out sharp edge corners can be machined with high accuracy.

DESCRIPTION OF EMBODIMENTS

Exemplary embodiments of a wire electrical discharge machining apparatus according to the present invention will be explained below in detail with reference to the drawings. This invention is not limited to the embodiments.

First Embodiment.

Figure 1:
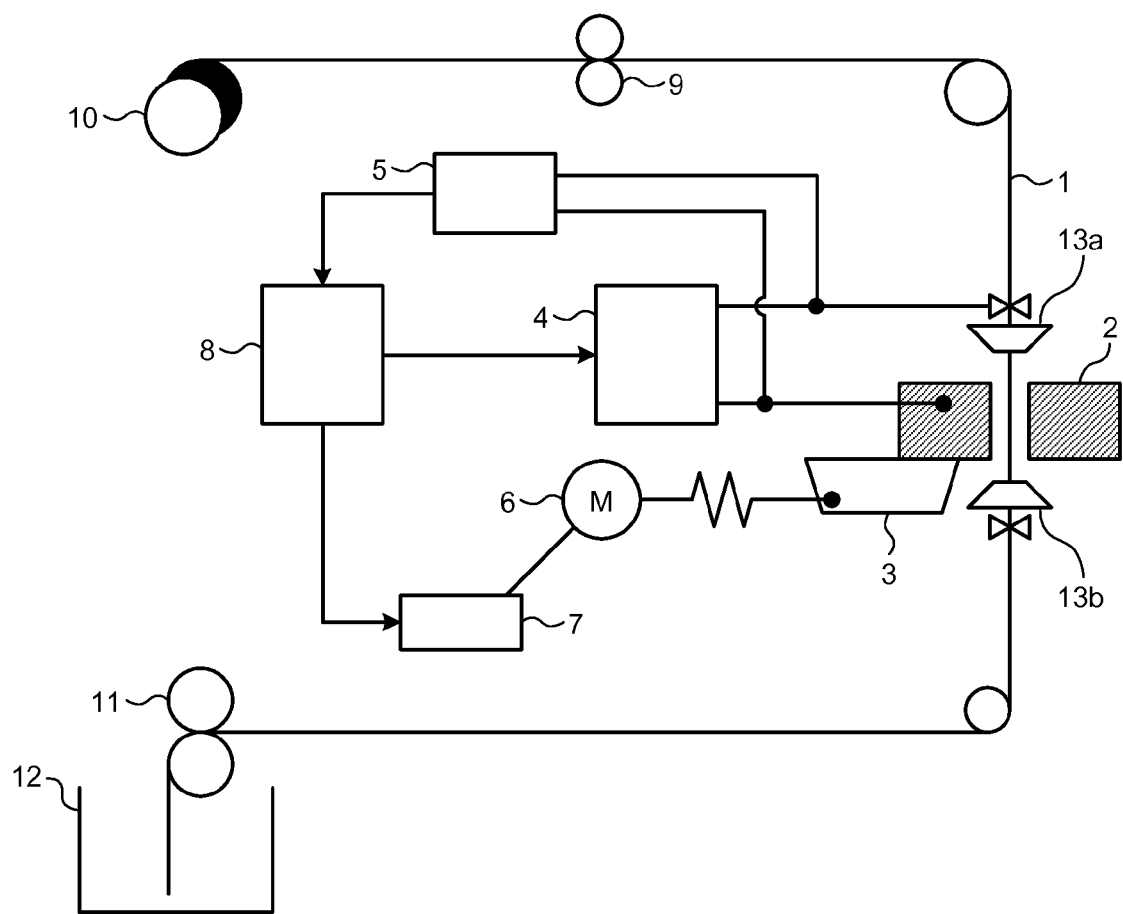
FIG. 1 is a diagram illustrating the configuration of a first embodiment of a wire electrical discharge machining apparatus according to the present invention.

FIG. 1 is a diagram illustrating the configuration of a first embodiment of a wire electrical discharge machining apparatus according to the present invention. The wire electrical discharge machining apparatus includes a wire 1, a table 3, a machining power supply 4, an interelectrode detection circuit 5, a servo motor 6, a servo amplifier 7, an NC control device 8, a tension applying mechanism 9, a wire bobbin 10, a wire travelling device 11, a wire collecting container 12, and machining fluid nozzles 13a and 13b. In finish machining, when the corner portion of a workpiece 2 is machined, the wire electrical discharge machining apparatus according to the first embodiment performs electrical discharge machining a plurality of times between the wire 1 and the workpiece 2 while performing the corner control of controlling the machining feed speed of the wire 1 such that the amount of machining per unit time becomes constant.

The table 3 moves the workpiece 2 in a fixed manner. The interelectrode detection circuit 5 detects the average interelectrode voltage during machining. The servo motor 6 drives the table 3. The servo amplifier 7 controls the driving of the servo motor 6. The NC control device 8 performs control, such as table feeding during machining, in accordance with the NC program.

A machining current is supplied between the wire 1 and the workpiece 2 by the machining power supply 4 and then an electrical discharge occurs between the wire 1 and the workpiece 2, whereby machining advances. At this point, the workpiece 2 can be machined into a desired shape by driving the table 3 in accordance with the NC program stored in the NC control device 8 in advance. Specifically, the servo amplifier 7 drives the servo motor 6 in accordance with the speed signal from the NC control device 8 and the workpiece 2 is moved, whereby machining advances.

The moving speed during machining is changed depending on the interelectrode state. Specifically, when the gap between the electrodes is large, the moving speed is increased and, when the gap between the electrodes is small, the moving speed is reduced; therefore, the wire 1 and the workpiece 2 can be prevented from coming into contact with each other and thus optimum machining can be performed. Because the gap distance during machining can be determined on the basis of the average voltage during machining, typically, the moving speed is controlled such that the average interelectrode voltage matches a predetermined target value.

Figure 2:
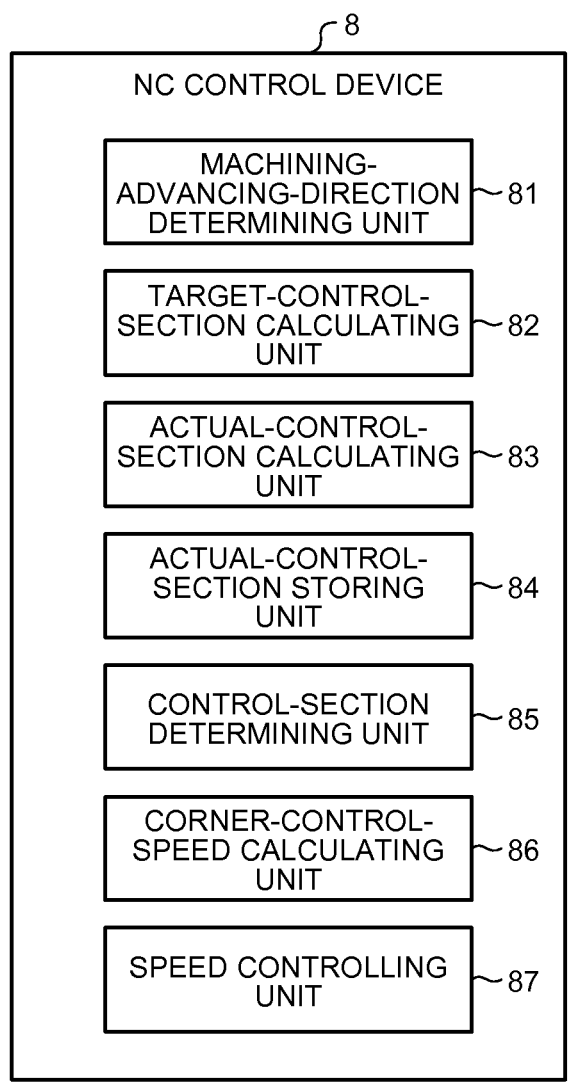
FIG. 2 is a diagram illustrating the functional configuration of an NC control device according to the first embodiment.

FIG. 2 is a diagram illustrating the functional configuration of the NC control device 8 according to the first embodiment. The NC control device 8 includes a machining-advancing-direction determining unit 81, a target-control-section calculating unit 82, an actual-control-section calculating unit 83, an actual-control-section storing unit 84, a control-section determining unit 85, a corner-control-speed calculating unit 86, and a speed controlling unit 87. The machining-advancing-direction determining unit 81 determines the machining direction when an out sharp edge corner is machined in accordance with the NC program. The target-control-section calculating unit 82 calculates a control section, which is similar to that in a typical wire electrical discharge machining apparatus, as a target control section. The target control section is a control section in the corner control when it is assumed that a shape error does not occur in the previous electrical discharge machining during finish machining. The actual-control-section calculating unit 83 calculates a control section in which a corner error is taken into consideration as an actual control section. The target control section and the actual control section will be described in detail later. The actual-control-section storing unit 84 stores therein the actual control section calculated by the actual-control-section calculating unit 83. The control-section determining unit 85 determines in accordance with the NC program whether the wire 1 has entered the actual control section at the time of machining the out sharp edge corner. The corner-control-speed calculating unit 86 calculates the moving speed of the wire 1 such that the amount of machining per unit time becomes constant in the control section.

Figure 3:
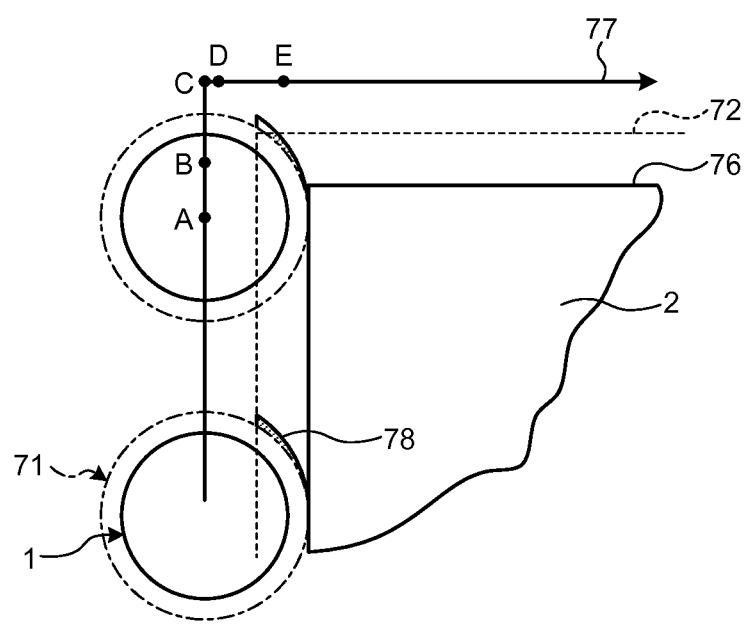
FIG. 3 is a diagram illustrating one example of a corner control section in an out-sharp-edge-corner portion machined by a typical wire electrical discharge machining apparatus.

Before explaining the corner control performed in the out-sharp-edge-corner portion by the wire electrical discharge machining apparatus according to the first embodiment, an explanation will be made of the corner control performed in the out-sharp-edge-corner portion by a typical wire electrical discharge machining apparatus. FIG. 3 is a diagram illustrating one example of the corner control section in the out-sharp-edge-corner portion machined by the typical wire electrical discharge machining apparatus. The typical wire electrical discharge machining apparatus calculates a section between wire central positions A and E as the control section on the premise that a shape error does not occur in rough machining or in the previous electrical discharge machining during finish machining and then performs machining speed control in this section. In other words, the wire 1 is moved along a trajectory 77 of the wire central position that is set such that a region 78, in which a discharge gap surface 71 and a pre-machined surface 72 overlap with each other, is formed. Accordingly, a machined surface 76 is formed on the workpiece 2 along the discharge gap surface 71.

Figure 4A:
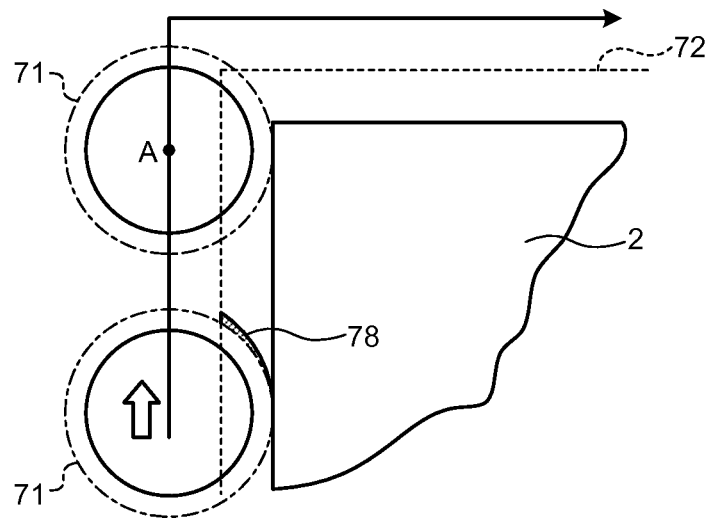
FIG. 4A is a diagram illustrating one example of out-sharp-edge-corner control performed by a typical wire electrical discharge machining apparatus.
Figure 4B:
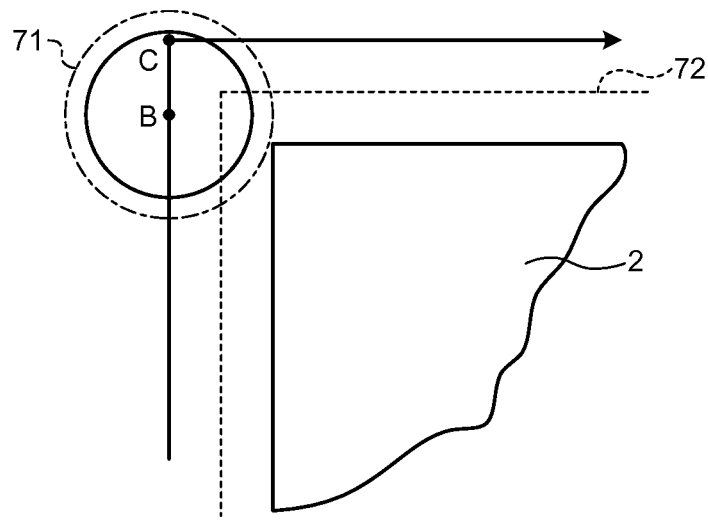
FIG. 4B is a diagram illustrating one example of the out-sharp-edge-corner control performed by the typical wire electrical discharge machining apparatus.
Figure 4C:
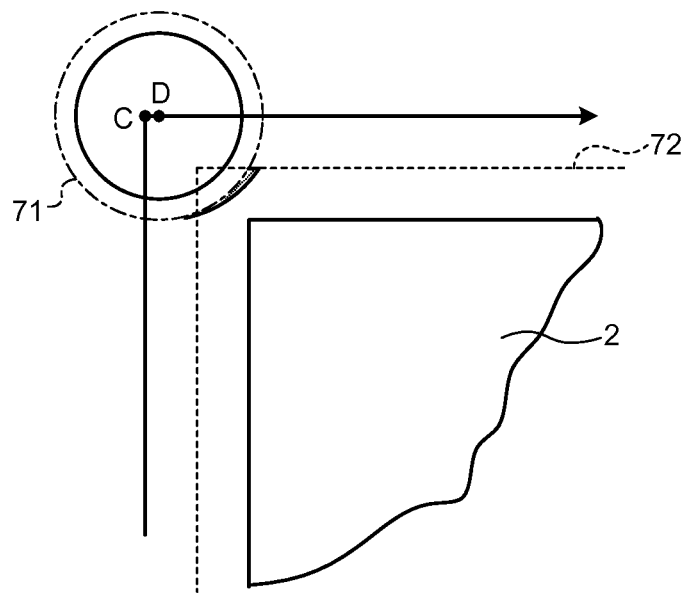
FIG. 4C is a diagram illustrating one example of the out-sharp-edge-corner control performed by the typical wire electrical discharge machining apparatus.
Figure 4D:
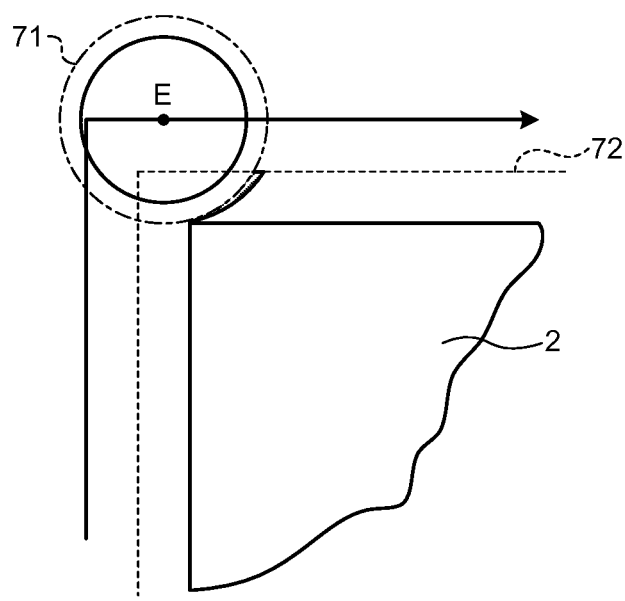
FIG. 4D is a diagram illustrating one example of the out-sharp-edge-corner control performed by the typical wire electrical discharge machining apparatus.

FIG. 4A to FIG. 4D are diagrams illustrating one example of the out-sharp-edge-corner control performed by a typical wire electrical discharge machining apparatus. The amount of machining in the out sharp edge corner is constant until the wire central position A is reached at the time of linear machining; however, after passing the wire central position A, the region 78, in which the discharge gap surface 71 and the pre-machined surface 72 overlap with each other, decreases and therefore the amount of machining decreases (FIG. 4A). At the wire central position B, the discharge gap surface 71 and the pre-machined surface 72 enters a non-overlapping state and therefore the amount of machining becomes zero (FIG. 4B). Furthermore, because the discharge gap surface 71 and the pre-machined surface 72 do not overlap with each other until the wire central position C (direction turning point) is reached, the amount of machining remains constant at zero. Even after the advancing direction changes, the discharge gap surface 71 and the pre-machined surface 72 do not overlap with each other until a wire central position D is reached; therefore, the amount of machining remains zero (FIG. 4C). After passing the wire central position D, the discharge gap surface 71 and the pre-machined surface 72 start overlapping with each other again and the region 78, in which the discharge gap surface 71 and the pre-machined surface 72 overlap with each other, is generated; therefore, the amount of machining gradually increases and returns to the amount of machining at the time of linear machining at the wire central position E (FIG. 4D).

Figure 5:
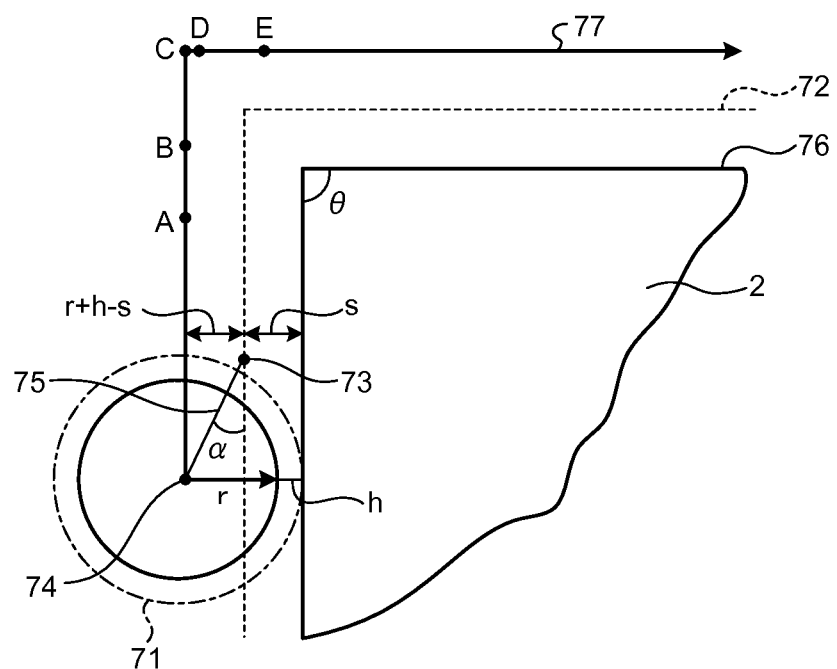
FIG. 5 is a diagram illustrating the positional relationship among wire central positions A to E.

FIG. 5 is a diagram illustrating the positional relationship among the wire central positions A to E. As illustrated in FIG. 5, in the case where the wire radius is r, the discharge gap is h, the machining allowance is s, the angle of the out sharp edge corner (angle of the corner formed by the machined surface 76) is θ, and the angle formed by a straight line 75 connecting an intersection 73 of the discharge gap surface 71, whose radius is the wire diameter+discharge gap (r+h), and the pre-machined surface 72 and a wire central position 74 and the pre-machined surface 72 is α, when the wire radius r, the discharge gap h, the machining allowance s, the angle θ of the out sharp edge corner, and the angle α formed by the straight line 75 connecting the intersection 73 of the discharge gap surface 71, whose radius is the wire diameter+discharge gap (r+h), and the pre-machined surface 72 and the wire central position 74 and the pre-machined surface 72 are used as machining parameters, sections $L_{A-B}$, $L_{B-C}$, $L_{C-D}$, and $L_{D-E}$ between the respective wire central positions A and B, B and C, C and D, and D and E on the trajectory 77 of the wire central position can be represented by the following Equations (1) to (4) on the basis of the machining parameters. Typically, $L_{A-B}$ and $L_{B-C}$ are referred to as preceding sections and $L_{C-D}$) and $L_{D-E}$, are referred to as following sections.

$$L_{A-B} = \frac{r+h-s}{\tan\alpha} - \frac{s}{\tan\theta} \qquad (1)$$

$$L_{B-C} = \frac{s}{\tan\theta} - \frac{r+h-s}{\tan\frac{\theta}{2}} \qquad (2)$$

$$L_{C-D} = \frac{r+h}{\tan\frac{\theta}{2}} - L_{D-E} \qquad (3)$$

$$L_{D-E} = \frac{r+h-s}{\tan\alpha} - \frac{s}{\tan\theta} \qquad (4)$$

Figure 6A:
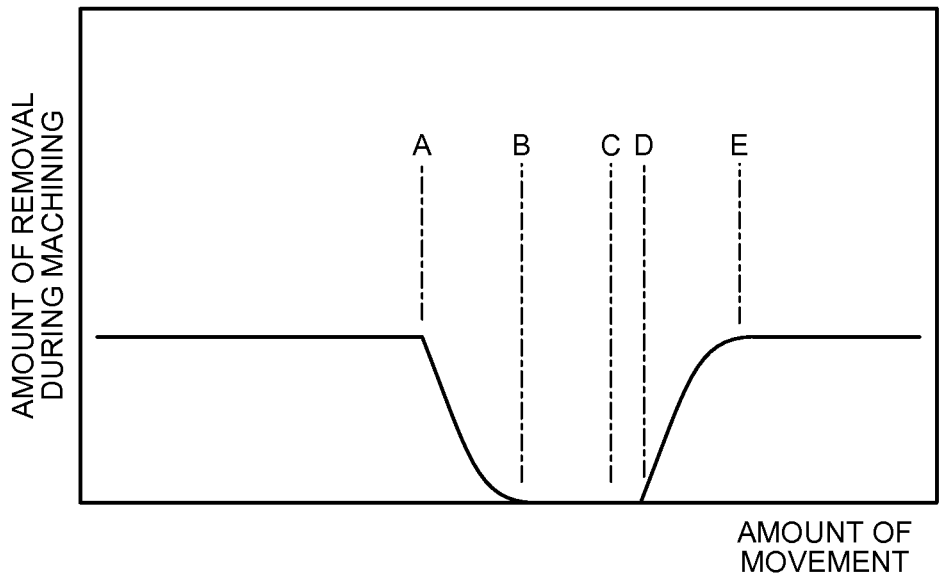
FIG. 6A is a diagram illustrating the relationship between the amount of movement and the amount of removal during machining in a typical wire electrical discharge machining apparatus.
Figure 6B:
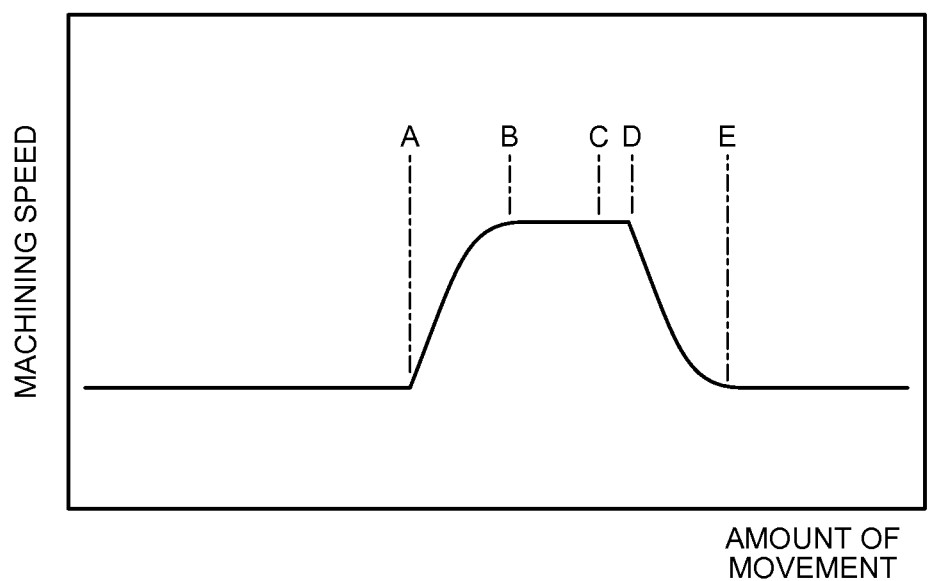
FIG. 6B is a diagram illustrating the relationship between the amount of movement and the machining speed in the typical wire electrical discharge machining apparatus.

FIG. 6A and FIG. 6B are diagrams illustrating the machining conditions of a typical wire electrical discharge machining apparatus. FIG. 6A illustrates the relationship between the amount of movement and the amount of removal during machining and FIG. 6B illustrates the relationship between the amount of movement and the machining speed. Even in the corner portion (section between the wire central positions A and E) in which the necessary amount of removal decreases, if the machining speed is controlled in a similar manner to that in the linear portion, machining is performed excessively and therefore a shape error occurs. In order to prevent this, it is necessary to control the machining speed such that the amount of machining per unit time becomes equivalent to that in the linear portion. Specifically, as illustrated in FIG. 6B, in the section between the wire central positions A and B, the machining speed is increased with a decrease in the amount of machining and, in the section between the wire central positions B and C and the section between the wire central positions C and D, although the amount of machining is zero, the machining speed is controlled so as to be a predetermined machining speed so that the machining speed can be immediately reduced in the section between the wire central positions D and E. Speed control is performed such that, in the section between the wire central positions D and E, the machining speed is reduced with an increase in the amount of machining and, in the section after the wire central position E, the machining speed is returned to a machining speed similar to that in the section before the wire central position A.

In the wire electrical discharge machining, the workpiece 2 is located between the portions that support the wire 1 at the upper and lower positions. When the workpiece 2 is machined, the workpiece 2 is locally melted and moreover a machining fluid around the workpiece 2 is vaporized and exploded by the thermal energy due to the electrical discharge. Due to the explosion, the wire 1 receives an external force and is deflected. The programmed machining trajectory is a trajectory of the point at which the wire 1 is supported and the wire 1 deviates from the programmed machining trajectory at least in a portion other than the support point due to the deflection of the wire 1. Because the workpiece 2 is located between the portions that support the wire 1, the workpiece 2 is machined by the wire 1 that has deviated from the programmed machining trajectory due to the deflection.

In the case of linear machining, the wire 1 is deflected backward or obliquely backward with respect to the machining advancing direction. Consequently, a shape error due to the deflection of the wire 1 occurs backward or obliquely backward; however, because the machining advancing direction does not change, a shape error uniformly occurs backward or obliquely backward. Therefore, the shape error can be corrected, for example, by adjusting the offset and thus the shape error does not become a major problem.

However, in the case of corner machining, the direction in which the machining advances changes; therefore, when the machining advancing direction changes, the trajectory of the deflected wire 1 takes a shortcut without passing the apex of the corner because the wire 1 is deflected in a direction that is backward or obliquely backward in relation to the machining advancing direction. Thus, a shape error does not occur in a uniform direction, which is problematic.

Figure 7:
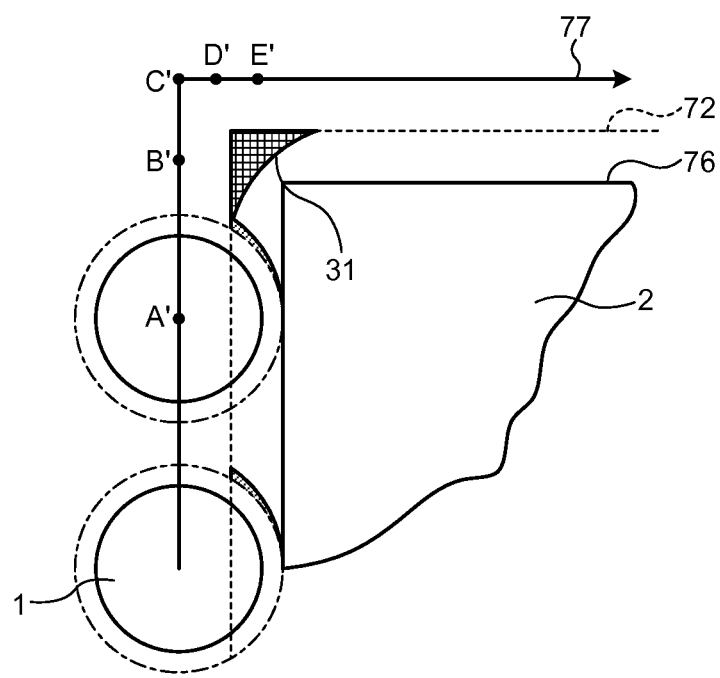
FIG. 7 is a diagram illustrating one example of a corner control section in an out-sharp-edge-corner portion machined by the wire electrical discharge machining apparatus according to the first embodiment.

FIG. 7 is a diagram illustrating one example of the corner control section in the out-sharp-edge-corner portion machined by the wire electrical discharge machining apparatus according to the first embodiment. As described above, in the actual out sharp edge corner, a shape error (hereinafter, referred to as a corner error) 31 occurs; therefore, the amount of machining starts changing not when the wire 1 reaches the wire central position A in FIG. 3 but when the wire 1 reaches a wire central position A' in FIG. 7. In other words, in the actual machining, the machining surface on which the corner error 31 has occurred in rough machining or in the previous electrical discharge machining during finish machining is machined; therefore, in the conventional corner control section, the amount of machining per unit time does not become constant in the section corresponding to the section between the wire central position A' in FIG. 7 and the wire central position A in FIG. 3 and thus the corner error 31 further occurs. Accordingly, the finishing accuracy of the out-sharp-edge-corner portion can be improved by performing speed control such that the amount of machining becomes constant in the accurate corner control section between A' and E' (actual control section), which is calculated in consideration of the corner error 31.

Figure 8A:
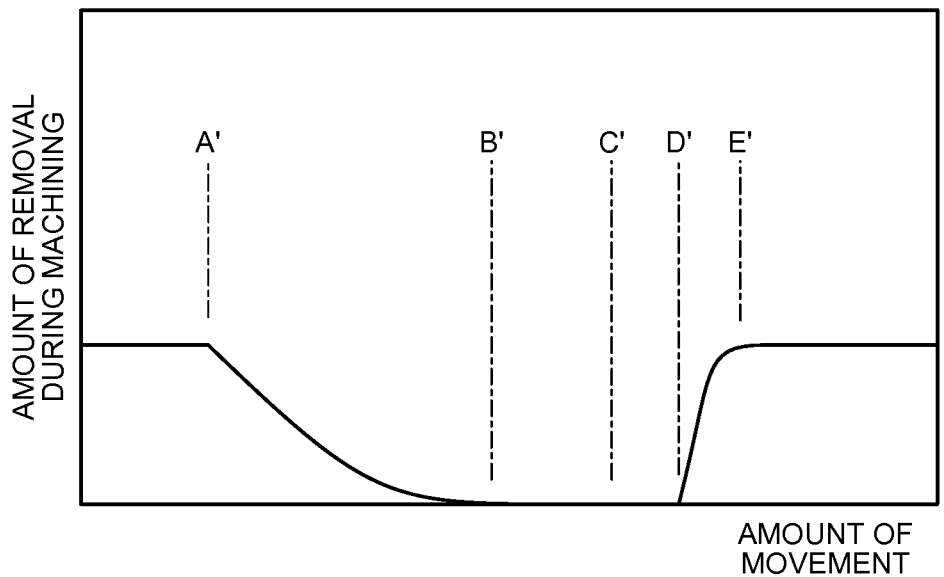
FIG. 8A is a diagram illustrating the relationship between the amount of movement and the amount of removal during machining in the wire electrical discharge machining apparatus according to the first embodiment.
Figure 8B:
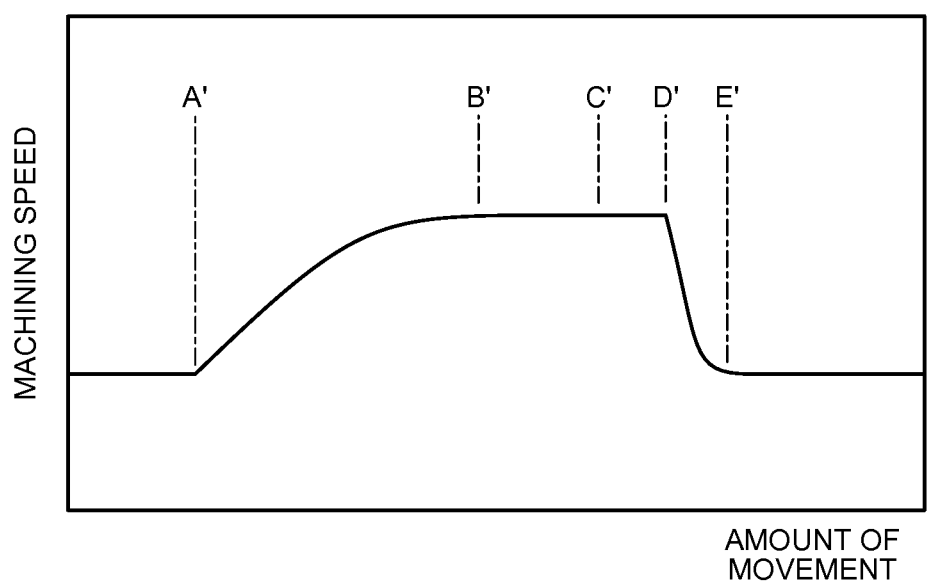
FIG. 8B is a diagram illustrating the relationship between the amount of movement and the machining speed in the wire electrical discharge machining apparatus according to the first embodiment.

FIG. 8A and FIG. 8B are diagrams illustrating the machining conditions of the wire electrical discharge machining apparatus according to the first embodiment. FIG. 8A illustrates the relationship between the amount of movement and the amount of removal during machining and FIG. 8B illustrates the relationship between the amount of movement and the machining speed. The wire electrical discharge machining apparatus according to the first embodiment accurately calculates the position from which the amount of removal during machining starts changing by taking a shape error into consideration and performs speed control such that the amount of machining per unit time becomes constant as illustrated in FIG. 8A and FIG. 8B in the actual control section starting from the above position, thereby realizing highly accurate out-sharp-edge-corner machining.

Figure 9:
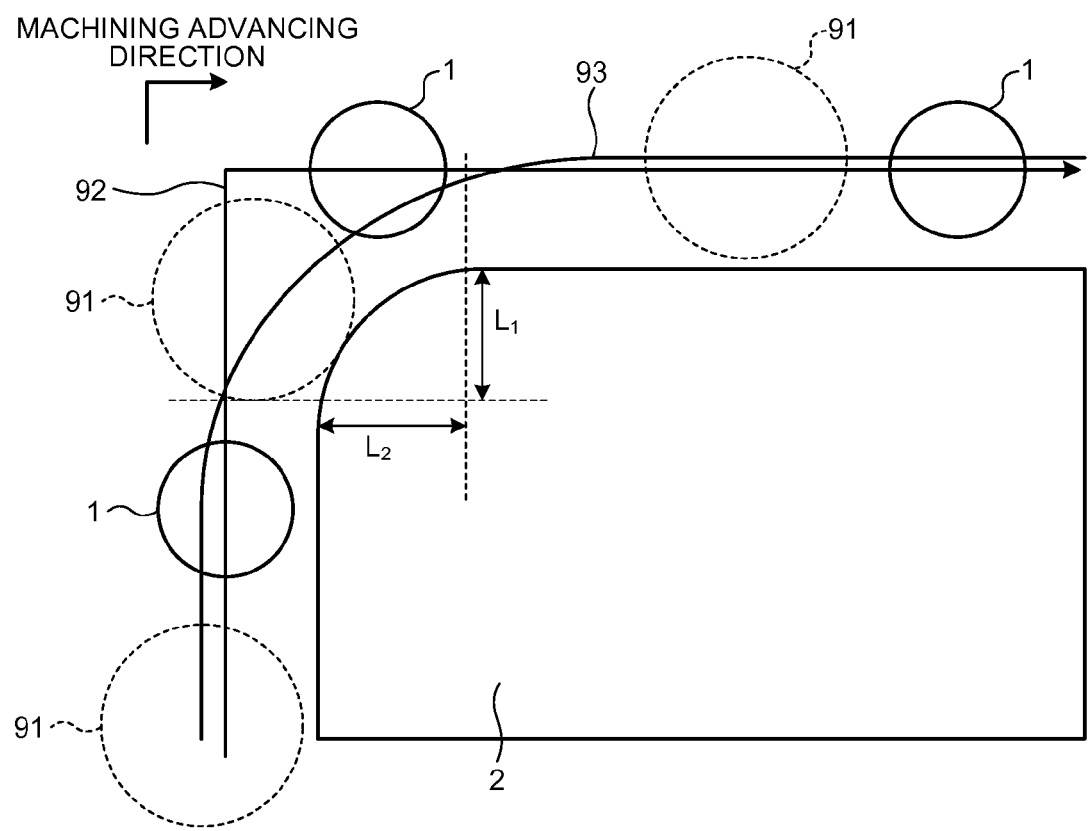
FIG. 9 is a diagram illustrating the movement of the wire when the out sharp edge corner is machined.

FIG. 9 is a diagram illustrating the movement of the wire when the out sharp edge corner is machined. When the out sharp edge corner is machined, the turning point of the machining direction is the apex of the corner. When the wire 1 on a programmed machining trajectory 92 passes the apex of the corner, a trajectory 93 of the deflected wire 1 takes a shortcut without passing the apex of the corner as illustrated in FIG. 9; therefore, a discharge gap surface 91 passes the inner side of the wire 1 in the corner portion and the corner error occurs. Consequently, there are distances over which corner errors $L_1$ and $L_2$ occur in two directions in linear machining from the apex of the corner. The actual control section is the control section in which the corner errors are taken into consideration, and highly accurate out-sharp-edge-corner machining can be realized by performing speed control such that the amount of machining becomes constant in this section.

In order to obtain the actual control section by using the actual-control-section calculating unit 83 and perform speed control such that the amount of machining becomes constant in this section, the NC control device 8 performs the following operation.

Figure 10:
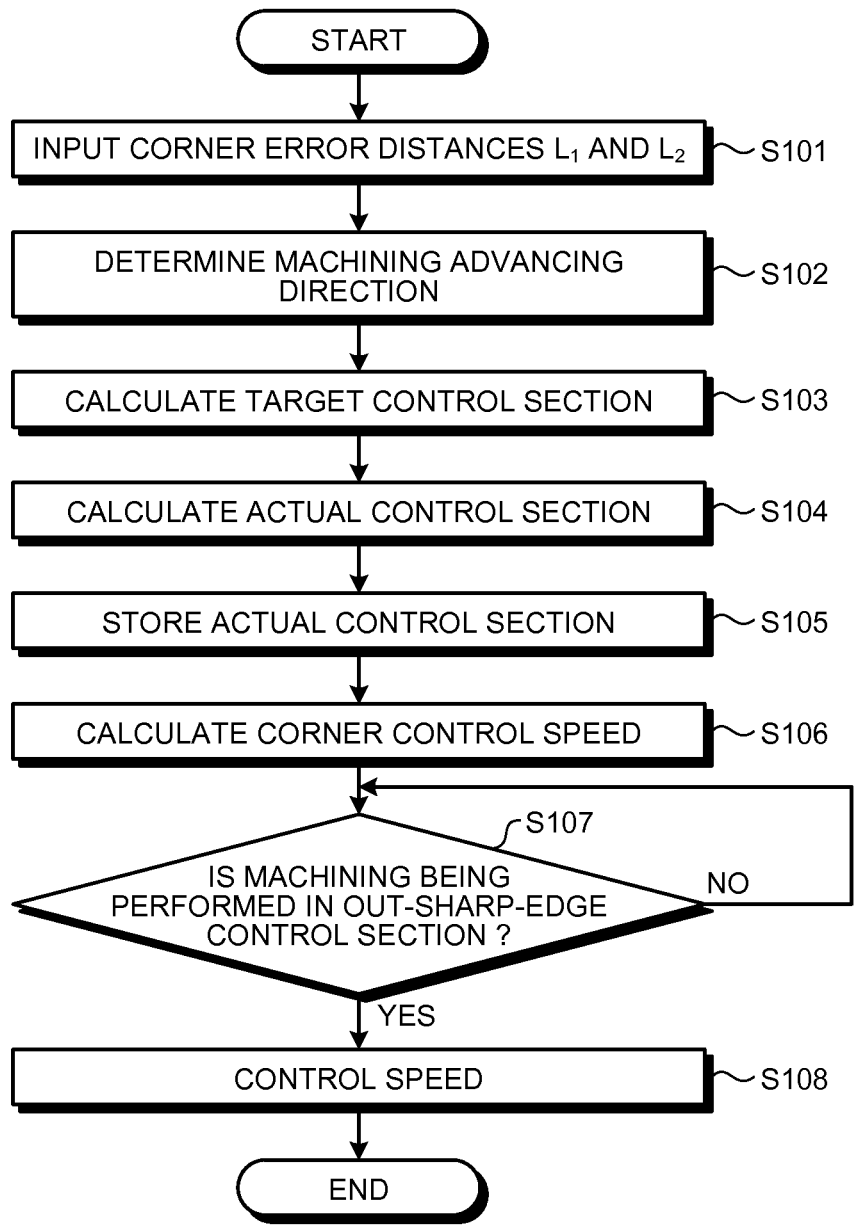
FIG. 10 is a flowchart illustrating the flow of the operation performed by the wire electrical discharge machining apparatus according to the first embodiment.

FIG. 10 is a flowchart illustrating the flow of the operation performed by the wire electrical discharge machining apparatus according to the first embodiment. In the present embodiment, a field to which corner error distances are input is provided and corner error distances are specified, whereby the actual control section obtained by adding or subtracting the corner error distances to or from the target control section, which is similar to the conventional control section, is stored and speed control is performed such that the amount of machining becomes constant in the stored actual control section, thereby realizing highly accurate out-sharp-edge-corner machining.

Specifically, the user first performs machining of the out-sharp-edge-corner shape without using the corner control and measures the corner error distances $L_1$ and $L_2$ that are headed in two directions, which are linear machining directions, from the apex of the out sharp edge corner for each electrical discharge machining during finish machining. The corner error distances $L_1$ and $L_2$ are defined such that $L_1$ is the corner error distance that occurs on the entry side of the out sharp edge corner in finish machining and $L_2$ is the corner error that occurs on the exit side of the out sharp edge corner in finish machining. The corner error distances $L_1$ and $L_2$ measured in such a manner are input to the input field before the out-sharp-edge-corner machining (Step S101).

Next, the machining-advancing-direction determining unit 81 determines the machining advancing direction (Step S102). Furthermore, the target-control-section calculating unit 82 calculates the target control section by the calculation similar to that for the conventional control section (Step S103). The calculation is performed by the target-control-section calculating unit 82 in a similar manner to the case of calculating the control section in a typical wire electrical discharge machining apparatus, and well-known methods can be used for the calculation. Then, the actual-control-section calculating unit 83 calculates the actual control section, in which the corner errors $L_1$ and $L_2$ are taken into consideration, on the basis of the corner errors $L_1$ and $L_2$ and the target control section (Step S104). In other words, the target control section is corrected on the basis of the starting point and the end point of the corner control and the corner errors $L_1$ and $L_2$.

If the measured corner error distances $L_1$ and $L_2$ are the machining result of the previous electrical discharge machining during finish machining, when the next electrical discharge machining is performed in the machining advancing direction as illustrated in FIG. 9, the amount of machining starts changing at a position that is $L_1$ before the direction turning point (apex of the corner); therefore, the actual control section until the wire central position C is a distance obtained by adding $L_1$ to the target control sections $L_{A\text{-}B}$ and $L_{B\text{-}C}$. Moreover, with regard to the distance until the amount of machining after passing the wire central position C returns to the amount of machining in the linear portion, because the target control section $L_{C\text{-}D}$ becomes slightly longer due to $L_2$, $L_{D\text{-}E}$ becomes shorter by the same amount; however, the sum of $L_{C\text{-}D}$ and $L_{D\text{-}E}$ is substantially unchanged. Moreover, when the next electrical discharge machining is performed in a direction opposite to that in FIG. 9, the actual control section becomes a distance obtained by adding $L_2$ to $L_{A-B}$ and $L_{B-C}$. Accordingly, the corner error distance to be added to or subtracted from the target control section changes depending on whether the machining advancing direction is in the same direction as or the opposite direction to that in the previous electrical discharge machining; therefore, the actual-control-section calculating unit 83 calculates the actual control section after the machining advancing direction is determined by the machining-advancing-direction determining unit 81.

The actual control section when machining the corner portion can be calculated by the following Equations (5) to (8). In Equations (5) to (8), s represents a machining allowance in a similar manner to Equations (1) to (4).

$$L'_{A-B} = L_{A-B} + L_1\left(1 - \frac{L_1}{s}\right) \quad (5)$$

$$L'_{B-C} = L_{B-C} + \frac{L_1^2}{s} \quad (6)$$

$$L'_{C-D} = L_{C-D} + \frac{L_2^2}{s} \quad (7)$$

$$L'_{D-E} = L_{D-E} + \frac{L_2^2}{s} \quad (8)$$

When the machining advancing direction is the same as the previous machining direction, the actual-control-section calculating unit 83 performs a calculation after switching $L_1$ and $L_2$ in Equations (5) to (8). In other words, the actual-control-section calculating unit 83 uses $L_1$ for calculating the preceding sections of the actual control section and uses $L_2$ for calculating the following sections of the actual control section.

The accurate control section calculated by using Equations (5) to (8) described above is stored in the actual-control-section storing unit 84 (Step S105), the corner-control-speed calculating unit 86 calculates the control speed with which the amount of machining becomes constant as illustrated in FIG. 8A and FIG. 8B in accordance with the control distance (Step S106), and finish machining is performed. During finish machining, the control-section determining unit 85 determines whether machining has reached the actual control section stored in the actual-control-section storing unit 84, i.e., whether machining is being performed in the control section of the out sharp edge (Step S107). When the control-section determining unit 85 determines that machining has reached the stored actual control section (Yes in Step S107), the speed controlling unit 87 controls the feed speed of the wire 1 (Step S108). Accordingly, a highly accurate out sharp edge corner can be realized. When the control-section determining unit 85 determines that machining has not reached the actual control section stored in the actual-control-section storing unit 84 (No in Step S107), the process returns to Step S107 and it is repeated to determine whether machining has reached the actual control section stored in the actual-control-section storing unit 84.

Figure 11:
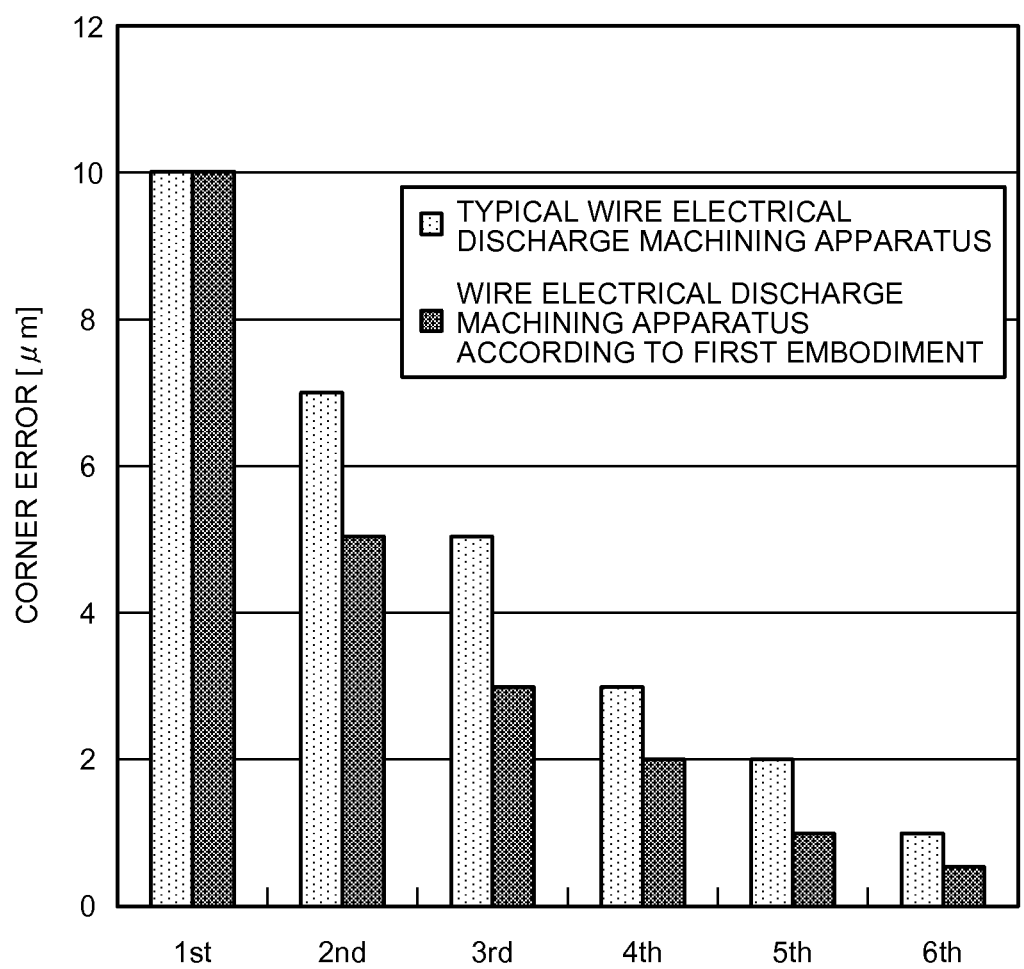
FIG. 11 is a diagram illustrating corner errors of the wire electrical discharge machining apparatus according to the first embodiment and a typical wire electrical discharge machining apparatus.

FIG. 11 is a diagram illustrating the corner errors of the wire electrical discharge machining apparatus according to the first embodiment and a typical wire electrical discharge machining apparatus. The horizontal axis indicates the number of times finish machining is performed. In the first finish machining, the corner control on the basis of the previous machining result cannot be performed because the previous machining is rough machining; therefore, the corner error is of the same degree as that of the typical wire electrical discharge machining apparatus. However, from the second and subsequent finish machinings, the corner control on the basis of the previous machining result can be performed; therefore, the corner error of the wire electrical discharge machining apparatus according to the first embodiment becomes smaller than the corner error of the conventional wire electrical discharge machining apparatus.

According to the first embodiment, the actual control section is calculated on the basis of the corner errors that occur in the previous electrical discharge machining during finish machining and speed control is performed such that the amount of machining per unit time becomes constant in the above section. Therefore, further highly accurate out-sharp-edge-corner control can be realized. Accordingly, production yields can be improved.

Second Embodiment.

The corner error changes in accordance with the content of the machining conditions and the configuration, e.g., setting of the machining energy and the wire tension. When the machining energy is high, the discharge reaction force increases and thus the deflection of the wire increases; therefore, the corner error distance also increases. Moreover, when the wire tension is low, the amount of deflection of the wire increases; therefore, the corner error distance also increases. In order to examine this relationship, the relationship between the machining energy and the corner error distance and the relationship between the wire tension and the corner error distance were obtained by experiment.

Figure 12:
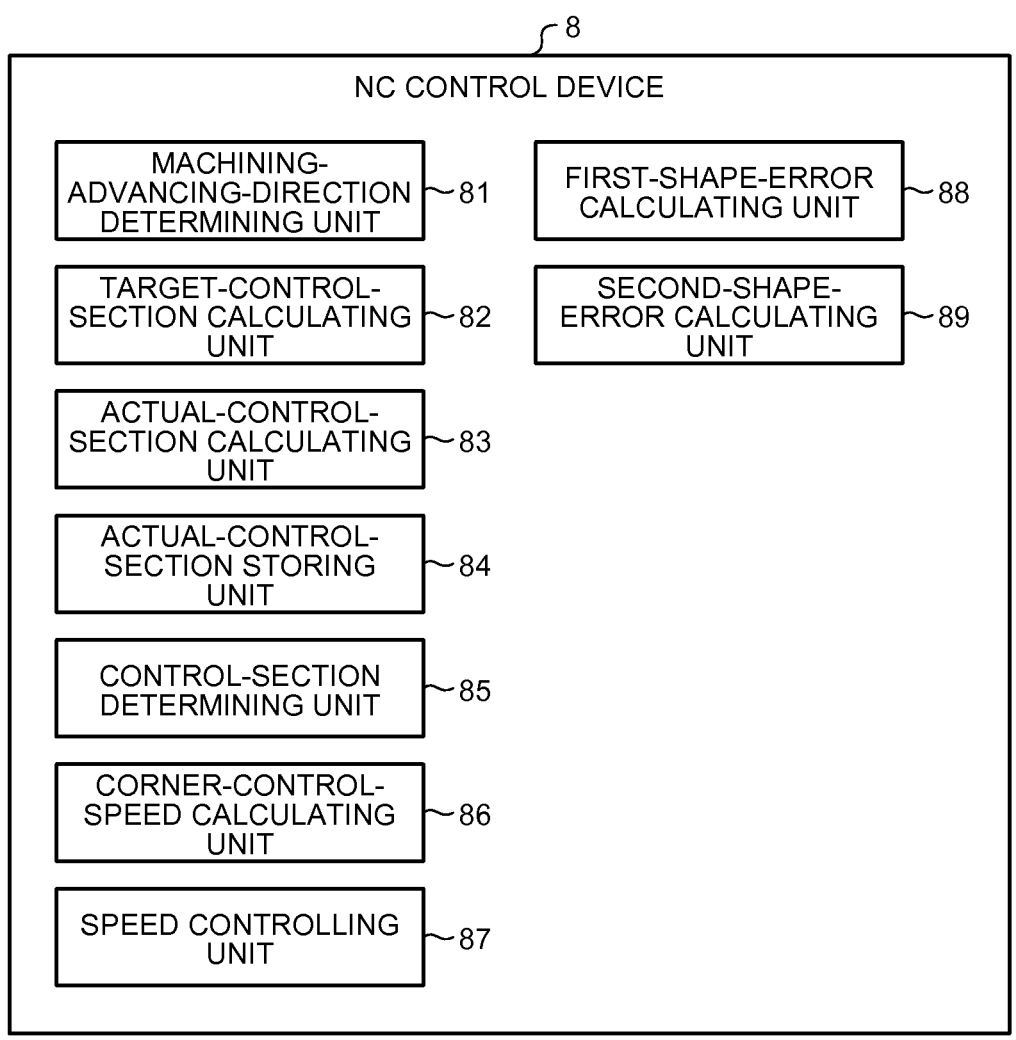
FIG. 12 is a diagram illustrating the configuration of an NC control device according to a second embodiment.

FIG. 12 is a diagram illustrating the configuration of the NC control device 8 according to the second embodiment. In addition to the machining-advancing-direction determining unit 81, the target-control-section calculating unit 82, the actual-control-section calculating unit 83, the actual-control-section storing unit 84, the control-section determining unit 85, the corner-control-speed calculating unit 86, and the speed controlling unit 87, the NC control device 8 includes a first-shape-error calculating unit 88 and a second-shape-error calculating unit 89. The first-shape-error calculating unit 88 calculates the corner error distances (first shape errors) that occur in the corner portion in accordance with the machining energy in the electrical discharge machining. The second-shape-error calculating unit 89 calculates the corner error distances (second shape errors) that occur in the corner portion in accordance with the wire tension.

Figure 13A:
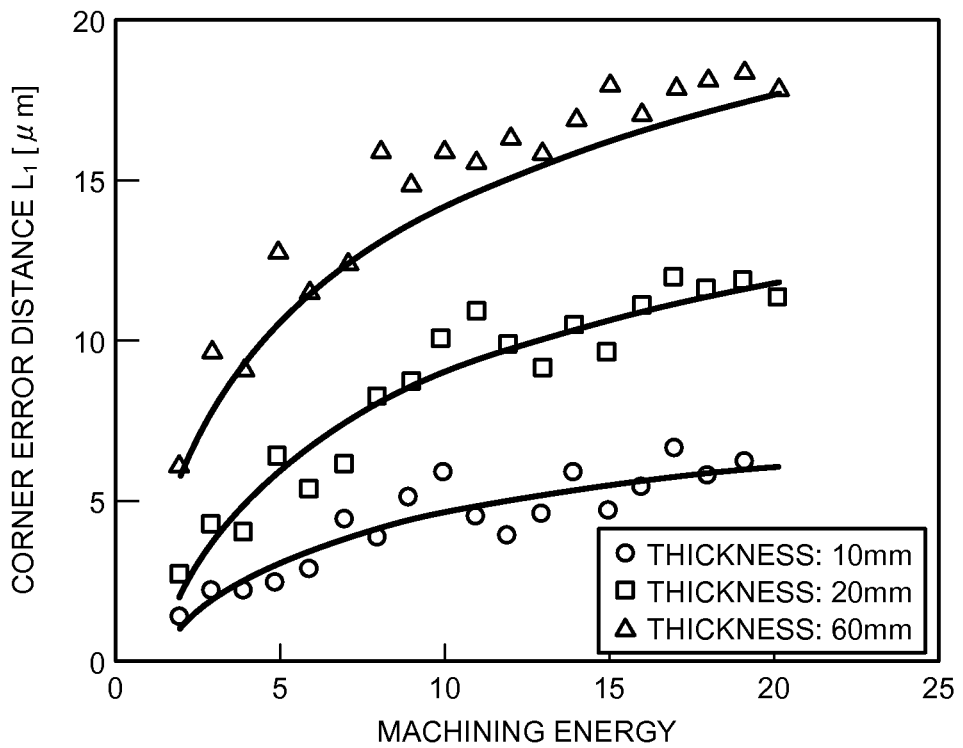
FIG. 13A is a diagram illustrating the relationship between the machining energy and the corner error distance obtained by experiment.
Figure 13B:
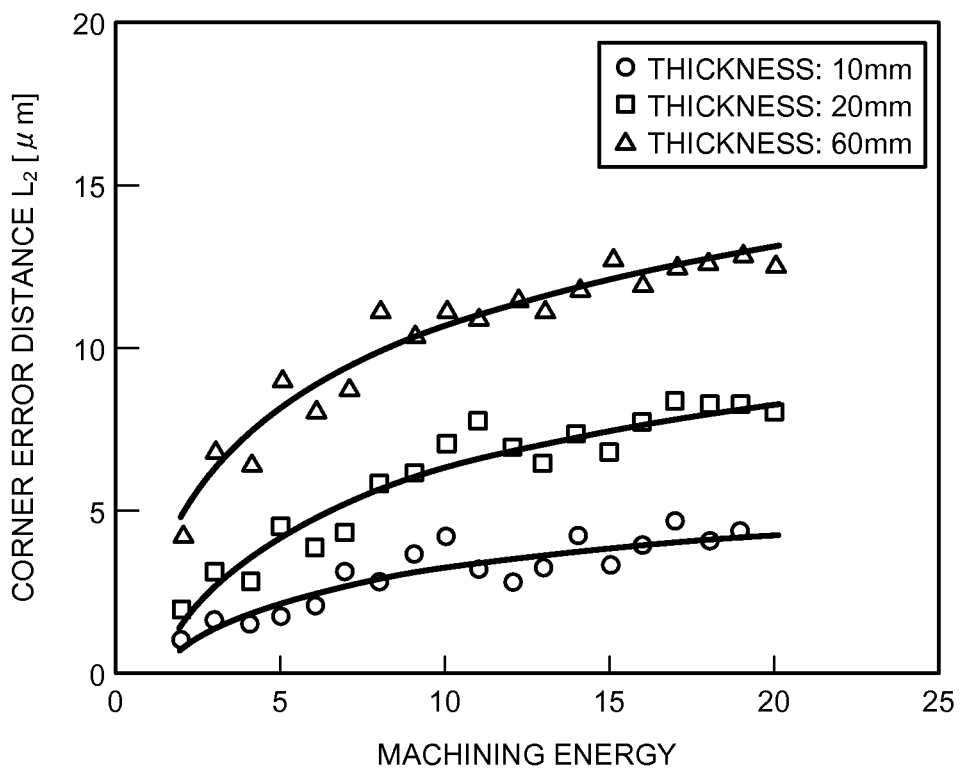
FIG. 13B is a diagram illustrating the relationship between the machining energy and the corner error distance obtained by experiment.
Figure 14A:
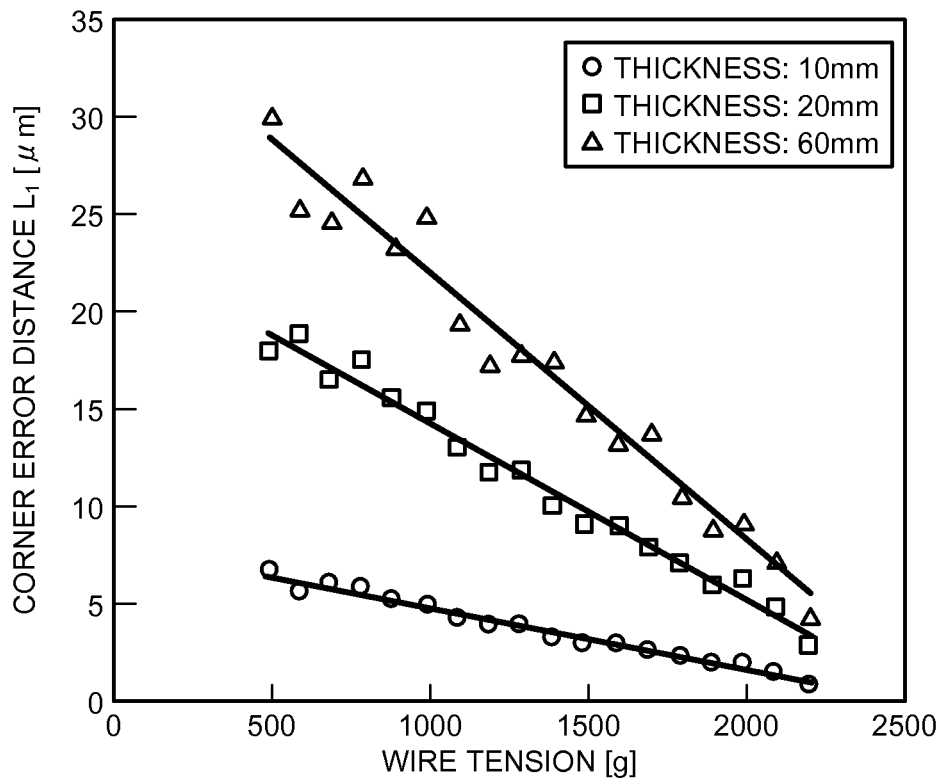
FIG. 14A is a diagram illustrating the relationship between the wire tension and the corner error distance obtained by experiment.
Figure 14B:
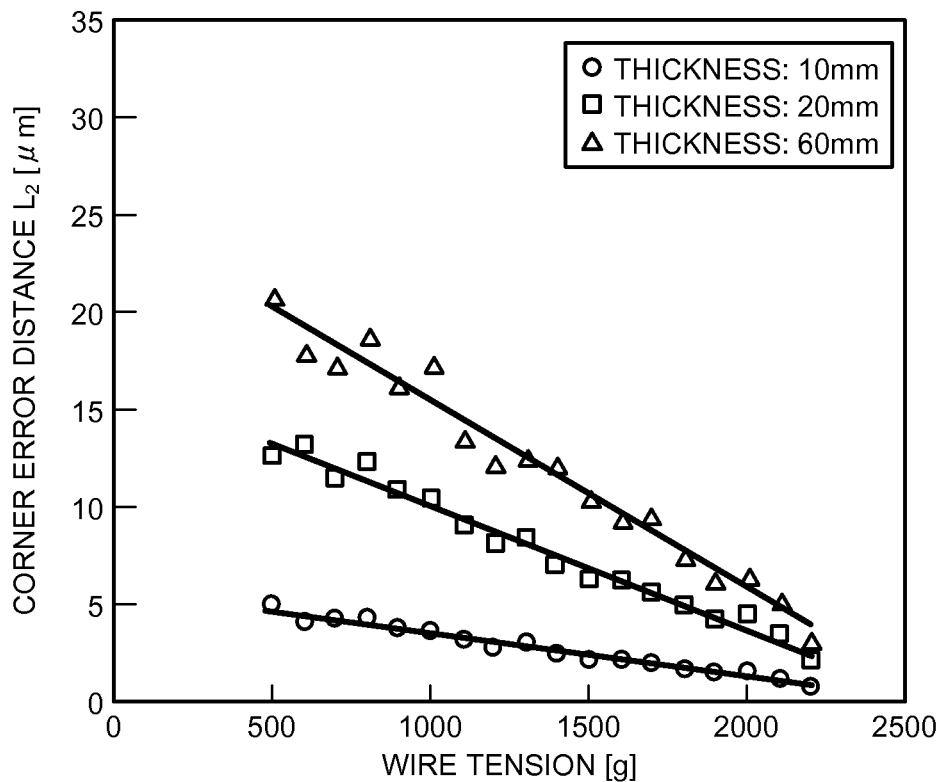
FIG. 14B is a diagram illustrating the relationship between the wire tension and the corner error distance obtained by experiment.

In the experiment, workpieces of 10 mm, 20 mm, and 60 mm were prepared, the out sharp edge corners of the workpieces were machined, and the corner error distances $L_1$ and $L_2$ at this point were measured. FIG. 13A and FIG. 13B are diagrams illustrating the relationship between the machining energy and the corner error distance obtained by experiment. FIG. 14A and FIG. 14B are diagrams illustrating the relationship between the wire tension and the corner error distance obtained by experiment. On the basis of FIG. 13A, FIG. 13B, FIG. 14A, and FIG. 14B, a table is prepared from which corner error distances (first shape errors) $L\_e_1$ and $L\_e_2$ due to the machining energy and corner error distances (second shape errors) $L\_wt_1$ and $L\_wt_2$ due to the wire tension are obtained, and corner error distances $L_1=L\_e_1+L\_wt_1$ and $L_2=L\_e_2+L\_wt_2$ that occur in the previous electrical discharge machining during finish machining are calculated from the table in accordance with the machining conditions. Moreover, the machining-advancing-direction determining unit 81 determines the machining advancing direction that is a feed direction of the wire in the next electrical discharge machining. When electrical discharge machining during finish machining is performed using the machining conditions described above, the actual-control-section calculating unit 83 calculates the accurate control section in the next electrical discharge machining obtained by adding or subtracting the corner error distances to or from the target control section pre-calculated as a control distance. In the calculated actual control section, the control speed with which the amount of machining becomes constant in each control section is calculated. When the control-section determining unit 85 determines that the section is the control section of the out sharp edge corner, the speed controlling unit 87 performs speed control. Accordingly, the wire electrical discharge machine in the present embodiment realizes highly accurate out-sharp-edge-corner machining.

Figure 15:
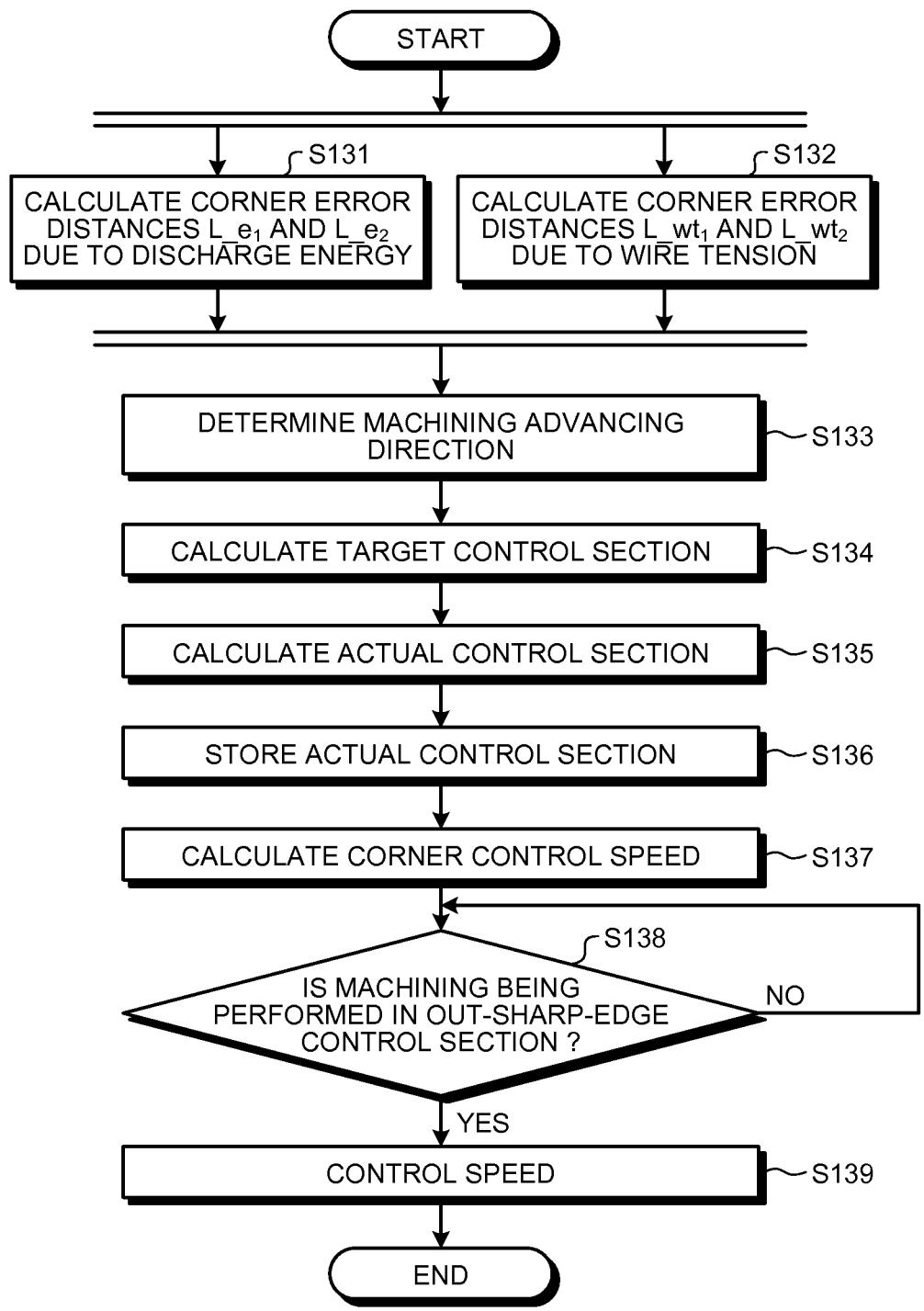
FIG. 15 is a flowchart illustrating the flow of the operation performed by a wire electrical discharge machining apparatus according to the second embodiment.

FIG. 15 is a flowchart illustrating the flow of the operation performed by the wire electrical discharge machining apparatus according to the second embodiment. The first-shape-error calculating unit 88 and the second-shape-error calculating unit 89 calculate the corner error distances $L\_e_1$ and $L\_e_2$ due to the machining energy and the corner error distances $L\_wt_1$ and $L\_wt_2$ due to the wire tension on the basis of the table (Steps S131 and S132).

The operations in Steps S133 to S139 are similar to the operations in Steps S102 to S108 in the first embodiment. However, in the process in Step S135, the actual-control-section calculating unit 83 calculates the corner error distances $L_1=L\_e_1+L\_wt_1$ and $L_2=L\_e_2+L\_wt_2$ that occur in the previous electrical discharge machining during finish machining in accordance with the machining conditions and calculates the actual control section by adding or subtracting the corner error distances to or from the target control section.

In the present embodiment, highly accurate out-sharp-edge-corner machining can be realized in accordance with the magnitudes of the machining energy and the wire tension.

Third Embodiment.

The wire electrical discharge machining is performed under various states from the state in which the upper and lower nozzles and the workpiece are close to each other such that the gap (hereinafter, referred to as nozzle gap) therebetween is about 0.1 mm to the state in which the upper and lower nozzles and the workpiece are apart from each other such that the nozzle gap is tens of millimeters. The distance in which the wire is constrained increases as the nozzle gap increases; therefore, the deflection of the wire increases and thus the corner error distance also increases. Accordingly, it is necessary to calculate the control section by using the corner error distances in accordance with the state of the nozzle gap and perform speed control in the above section. Therefore, in the third embodiment, the corner error distances in accordance with the nozzle gap are obtained.

Figure 16:
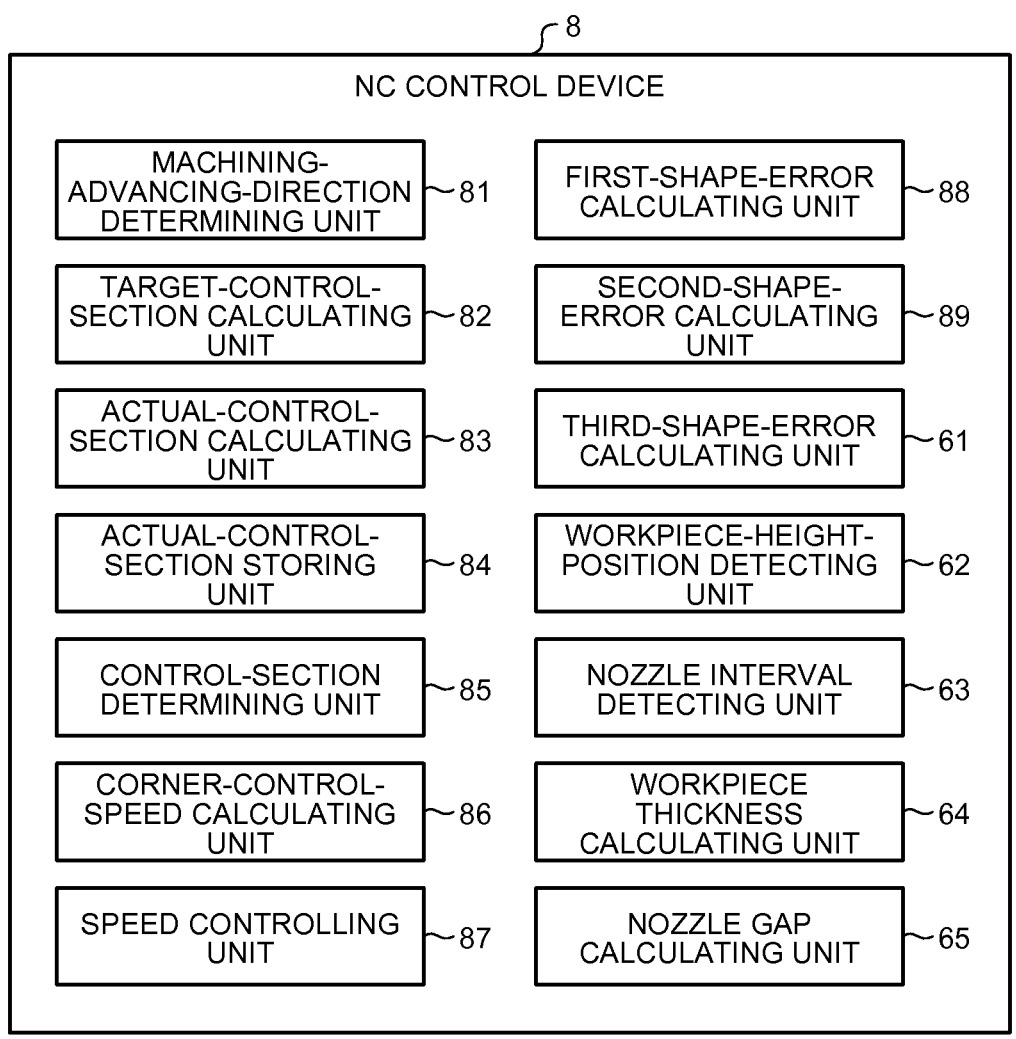
FIG. 16 is a diagram illustrating the configuration of an NC control device according to a third embodiment.

FIG. 16 is a diagram illustrating the configuration of the NC control device 8 according to the third embodiment. In addition to the machining-advancing-direction determining unit 81, the target-control-section calculating unit 82, the actual-control-section calculating unit 83, the actual-control-section storing unit 84, the control-section determining unit 85, the corner-control-speed calculating unit 86, the speed controlling unit 87, the first-shape-error calculating unit 88, and the second-shape-error calculating unit 89, the NC control device 8 includes a third-shape-error calculating unit 61, a workpiece-height-position detecting unit 62, a nozzle interval detecting unit 63, a workpiece thickness calculating unit 64, and a nozzle gap calculating unit 65. The workpiece thickness calculating unit 64 determines the position of the workpiece 2 and calculates the thickness of the workpiece 2. The nozzle gap calculating unit 65 calculates the nozzle gap.

Figure 17:
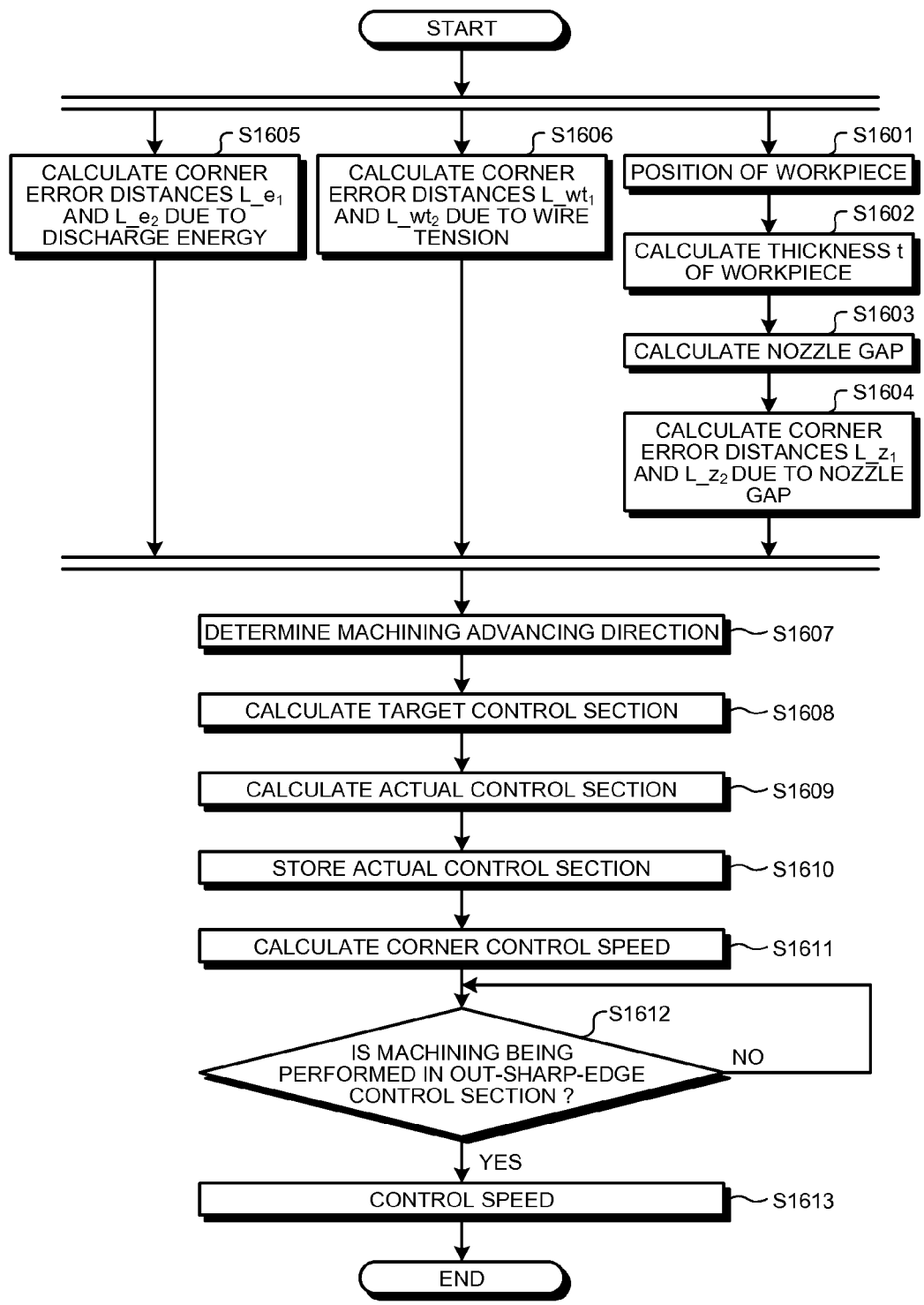
FIG. 17 is a flowchart illustrating the flow of the operation performed by a wire electrical discharge machining apparatus according to the third embodiment.
Figure 18A:
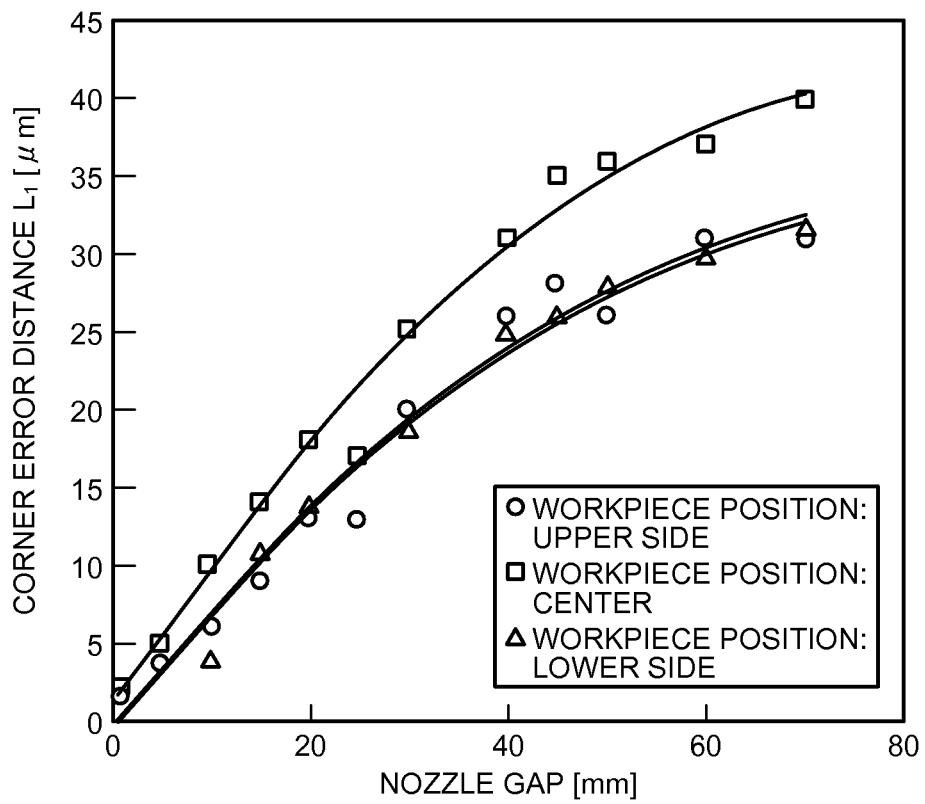
FIG. 18A is a diagram illustrating the relationship between the nozzle gap and the corner error distance obtained by experiment.
Figure 18B:
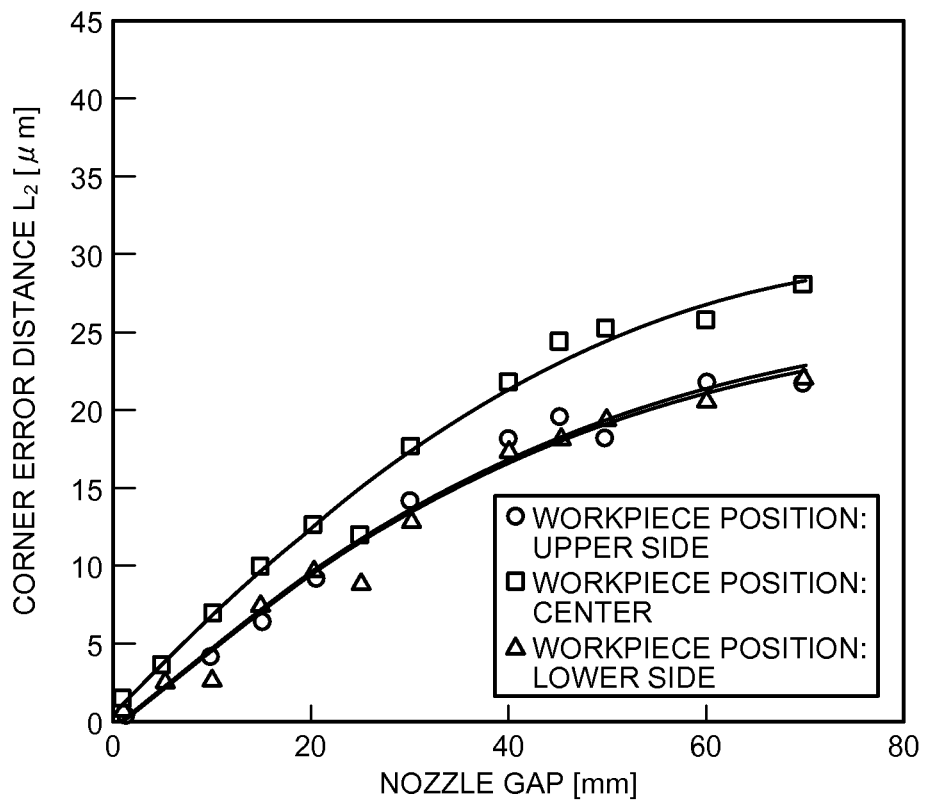
FIG. 18B is a diagram illustrating the relationship between the nozzle gap and the corner error distance obtained by experiment.

FIG. 17 is a flowchart illustrating the flow of the operation performed by a wire electrical discharge machining apparatus according to the third embodiment. First, the workpiece-height-postion detecting unit 62 determines the height position of the workpiece (Step S1601). At this point, the height position of the workpiece is determined on the basis of the difference or ratio between the upper and lower machining fluid pressures by using the fact that the machining fluid pressure of the nozzle on the side closer to the workpiece 2 becomes higher. Alternatively, it is possible to provide a function for the position of the workpiece 2 to be input by the user, determine that the workpiece is located in the middle when there is no input, and perform control. Next, the nozzle interval detecting unit 63 recognizes the upper-and-lower-nozzle interval from the Z-axis height of the machine and the workpiece thickness calculating unit 64 calculates the thickness t of the workpiece from the machining conditions at the time of rough machining (Step S1602). It is possible to use well-known methods disclosed in Japanese Examined Patent Application Publication No. H02-29453, Japanese Patent Application Laid-open No. H9-290328, and the like for calculating the thickness t of the workpiece. The nozzle gap calculating unit 65 obtains the nozzle gap from the difference between the upper-and-lower-nozzle interval and the thickness of the workpiece (Step S1603). Then, on the basis of the table from which the corner error distances $L\_z_1$ and $L\_z_2$ due to the nozzle gap are obtained from the relationship between the nozzle gap and the corner error distance obtained in advance by experiment, the third-shape-error calculating unit 61 calculates the corner error distances (third shape errors) $L\_z_1$ and $L\_z_2$ that occur in the corner portion in accordance with the nozzle gap in the previous electrical discharge machining during finish machining (Step S1604). FIG. 18A and FIG. 18B are diagrams illustrating the relationship between the nozzle gap and the corner error distance obtained by experiment.

The processes in Steps S1605 to S1613 are similar to those in Steps S131 to S139 in the second embodiment. However, in the process in Step S1609, the actual control section is calculated in consideration of further the corner error distance $L\_z$ due to the nozzle gap in addition to the second embodiment. In other words, the corner error distances $L_1=L\_e_1+L\_wt_1+L\_z_1$ and $L_2=L\_e_2+L\_wt_2+L\_z_2$ are calculated by summing the corner error distances in the previous electrical discharge machining during finish machining obtained on the basis of the tables from the machining energy, the wire tension, the nozzle gap in Steps S1604 to S1606, and the actual control section is calculated by adding or subtracting the corner error distances $L_1$ and $L_2$ to or from the target control section that is pre-calculated in Step S1608.

In the present embodiment, because the corner error distances are calculated in consideration of the nozzle gap, highly accurate out-sharp-edge-corner machining can be realized.

INDUSTRIAL APPLICABILITY

As described above, the wire electrical discharge machining apparatus according to the present invention is useful in that an out sharp edge corner can be machined with high accuracy.

REFERENCE SIGNS LIST 1 wire
2 workpiece
3 table
4 machining power supply
5 interelectrode detection circuit
6 servo motor 7 servo amplifier
8 NC control device
9 tension applying mechanism
10 wire bobbin
11 wire travelling device
12 wire collecting container
13a, 13b machining fluid nozzle
31 shape error (corner error)
61 third-shape-error calculating unit
62 workpiece-height-position detecting unit
63 nozzle interval detecting unit
64 workpiece thickness calculating unit
65 nozzle gap calculating unit
71, 91 discharge gap surface
72 pre-machined surface
73 intersection
74 wire central position
75 straight line
76 machined surface
77 trajectory of wire central position
78 region in which discharge gap surface and pre-machined surface overlap with each other
81 machining-advancing-direction determining unit
82 target-control-section calculating unit
83 actual-control-section calculating unit
84 actual-control-section storing unit
85 control-section determining unit
86 corner-control-speed calculating unit
87 speed controlling unit
88 first-shape-error calculating unit
89 second-shape-error calculating unit
92 programmed machining trajectory
93 trajectory of wire

The invention claimed is:

1. A wire electrical discharge machining apparatus that performs electrical discharge machining between a wire and a workpiece a plurality of times while performing corner control in which a feed speed of the wire when a corner portion of the workpiece is machined in finish machining is made higher than that when a portion other than the corner portion is machined, the apparatus comprising:
   a target-control-section calculating unit that determines that a shape error does not occur in the corner portion in a previous electrical discharge machining and calculates a target control section, which is indicated by a start point and an end point of the corner control in a current electrical discharge machining during the finish machining, on a basis of a machining parameter;
   an actual-control-section calculating unit that measures a magnitude of a shape error of the corner portion in a previous electrical discharge machining during the finish machining and corrects the start point and the end point of the corner control, which are indicated in the target control section calculated by the target-control-section calculating unit, and calculates an actual control section, on a basis of the measured magnitude of a shape error; and
   a speed controlling unit that controls the feed speed of the wire such that an amount of machining per unit time in the actual control section becomes equal to that when a portion other than the corner portion is machined.

2. The wire electrical discharge machining apparatus e according to claim 1, further comprising:
   a first-shape-error calculating unit that calculates a first shape error that occurs in the corner portion in accordance with an energy of the electrical discharge machining; and
   a second-shape-error calculating unit that calculates a second shape error that occurs in the corner portion in accordance with a tension of the wire, wherein
   the actual-control-section calculating unit calculates a magnitude of a shape error of the corner portion in a previous electrical discharge machining during the finish machining by adding the first shape error and the second shape error.

3. The wire electrical discharge machining apparatus according to claim 2, further comprising:
   a nozzle interval detecting unit that detects an interval between nozzles;
   a workpiece thickness calculating unit that detects a thickness of the workpiece on a basis of a machining condition in a previous electrical discharge machining during the finish machining;
   a nozzle gap calculating unit that calculates a nozzle gap, which is a gap between the nozzles and the workpiece, on a basis of the interval between the nozzles and the thickness of the workpiece;
   a workpiece-height-position detecting unit that detects a height position of the workpiece between the nozzles; and
   a third-shape-error detecting unit that calculates a third shape error that occurs in the corner portion in accordance with the nozzle gap and the height position of the workpiece, wherein
   the actual-control-section calculating unit calculates a magnitude of a shape error of the corner portion in a previous electrical discharge machining during the finish machining by further adding the third shape error detected by the third-shape-error detecting unit in addition to the first shape error and the second shape error.

4. The wire electrical discharge machining apparatus according to claim 2, further comprising a machining-advancing-direction determining unit that determines a machining advancing direction in the electrical discharge machining, wherein
   the actual-control-section calculating unit separately calculates a magnitude of shape errors of the corner portion before and after the wire passes an apex of the corner portion in a previous electrical discharge machining during the finish machining and calculates the actual control section by adding or subtracting different shape errors to or from portions before and after the wire passes the apex of the corner portion in the target control section in accordance with the machining advancing direction determined by the machining-advancing-direction determining unit.

* * * * *